(12) United States Patent
Ferretti

(10) Patent No.: US 7,415,772 B1
(45) Date of Patent: Aug. 26, 2008

(54) RAINBOW RULER

(76) Inventor: Shelly Lynne Ferretti, 1035 Mission Dr., Erie, PA (US) 16509

( * ) Notice: Subject to any disclaimer, the term of this patent is extended or adjusted under 35 U.S.C. 154(b) by 12 days.

(21) Appl. No.: 11/649,188

(22) Filed: Jan. 3, 2007

(51) Int. Cl.
*G01B 3/02* (2006.01)
(52) U.S. Cl. .......................... 33/494; 33/491; 33/679.1
(58) Field of Classification Search ................. 33/494, 33/491, 483–484, 758, 760, 562, 563, 566, 33/679.1; 434/188, 195, 196, 207
See application file for complete search history.

(56) References Cited

U.S. PATENT DOCUMENTS

| | | | |
|---|---|---|---|
| 4,547,969 A * | 10/1985 | Haack | ........................ 33/494 |
| 4,614,042 A | 9/1986 | Maurer | |
| 4,750,270 A | 6/1988 | Kundikoff | |
| 4,778,390 A | 10/1988 | Marans | |
| 5,335,421 A * | 8/1994 | Jones, Jr. | ..................... 33/494 |
| 5,746,001 A | 5/1998 | Fisher | |
| 5,881,469 A | 3/1999 | Monck | |
| 6,243,959 B1 | 6/2001 | Monck | |
| 6,813,841 B1 | 11/2004 | Ramsey | |
| 7,076,881 B1 * | 7/2006 | Perry | ......................... 33/494 |

* cited by examiner

*Primary Examiner*—Yaritza Guadalupe-McCall
(74) *Attorney, Agent, or Firm*—Richard K. Thomson

(57) ABSTRACT

A set of rulers for teaching the concept of measurements includes a first ruler having a first group of incremental division lines corresponding to a first group of measured lengths, each line of the first group having a first length and a first color. A second ruler in the set adds a second group of incremental division lines corresponding to a second group of measured lengths, each line of the second group having a second length and a second color, the second group of lines extending from an distal end portion of the first group where the second group of measured lengths corresponds to the first group. A third ruler of the set adds a third group of incremental lines corresponding to a third group of measured lengths, each line of the third group having a third length and color and, where the third group of measured lengths corresponds to the first and second groups, extends from the distal ends of the second group of lines. A method of using the set of rulers to teach is also disclosed.

9 Claims, 2 Drawing Sheets
(2 of 2 Drawing Sheet(s) Filed in Color)

RAINBOW RULER

BACKGROUND AND SUMMARY OF THE INVENTION

The present invention relates to the field of instructional materials. More particularly, the present invention is directed to a set of rulers which can be used to assist teachers in imparting the concept of measurements, particularly to educationally-challenged students.

Use of a ruler to take measurements is a particularly difficult concept for certain educationally-challenged students to embrace. Such students include autistic children. Distinguishing between a group of similarly-colored, closely-spaced lines is all but impossible for such students and produces a great deal of frustration for both the student and the teacher and, seldom, if ever, produces the desired learning.

The set of rulers used in the present invention, available under the trade name RAINBOW RULER!!, has shown remarkable success in overcoming the learning barrier incurred when conventional rulers are used in an attempt to teach educationally-challenged children. The teaching tools of the present invention comprise a set of rulers for teaching educationally-challenged students to read measurements, the set including a) a first ruler having a first group of incremental division lines for a first group of measured lengths, each of the lines of the first group having a first length extending from a proximal end to a distal end and being of a first color; b) a second ruler having the first group of incremental division lines of the first length and the first color and a second group of incremental division lines for a second group of measured lengths, each of the lines of the second group having a second length and a second color, the second group of lines having a proximal end extending from a distal end of the lines of the first group when the second group of measured lengths correspond to the first group of measured lengths; c) a third ruler having i) the first group of incremental division lines of the first length and the first color, ii) the second group of incremental division lines of the second length and the second color and, iii) a third group of incremental division lines for a third group of measured lengths, each of the lines of the third group having a third length and a third color, the third group of lines having a proximal end extending from a distal end of the lines of the second group when the third group of measured lengths correspond to the second group of measured lengths.

Each of the three rulers has a fourth group of incremental division lines for a fourth group of measured lengths, each of the lines of the fourth group having a fourth length and fourth color, the fourth length being greater than the first, second and third lengths. Most preferably, the fourth length is greater than a combination of the first, second and third lengths for measured lengths where the third group of lines extend from the distal end of the second group of lines.

An alternate aspect of the present invention is directed to the method of teaching children to read fractions of inches using this series or set of rulers.

Various other features, advantages, and characteristics of the present invention will become apparent after a reading of the following detailed description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The preferred embodiment(s) of the present invention is/are described in conjunction with the associated drawings in which like features are indicated with like reference numerals and in which.

DETAILED DESCRIPTION OF THE PREFERRED EMBODIMENT(S)

Figure 1:
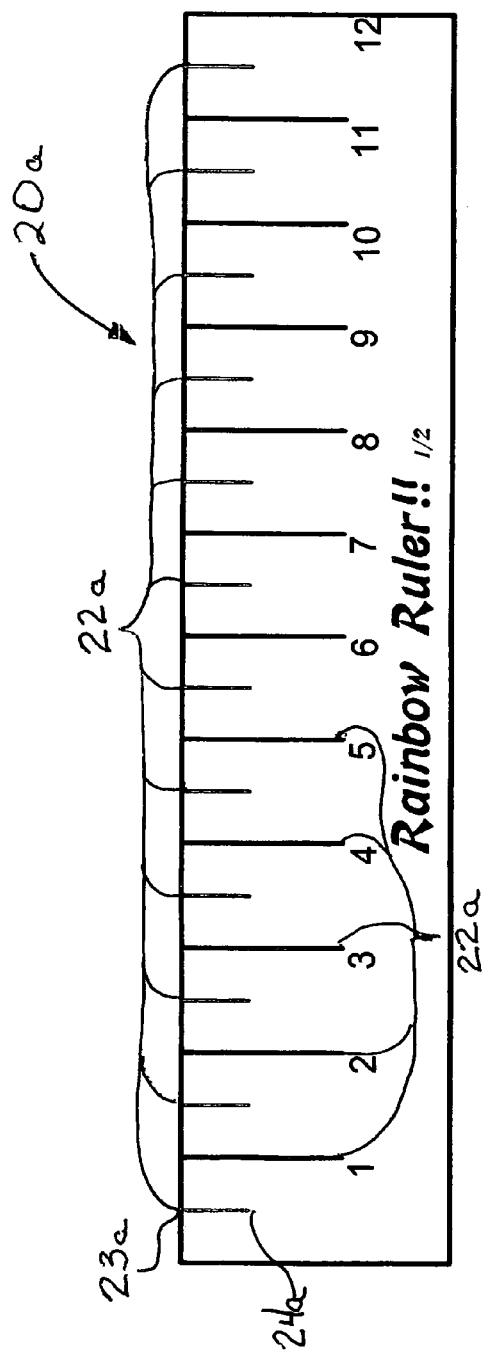
FIG. 1 is a front view of a first ruler of the set of rulers of the first embodiment of the Rainbow Ruler of the present invention.

A first ruler of the first set of rulers which comprise the first embodiment of the Rainbow Ruler of the present invention is shown in FIG. 1 generally at 20a. First ruler 20a has a first group 22a of incremental division lines for a first group of measured lengths, in this case, half inches, each of the lines of said first group 22a having a first length extending from a proximal end 23a to a distal end 24a and being of a first color, in this case red. On each of the three rulers, 20a, 20b, and 20c, the name "Rainbow Ruler!!" appears. On first ruler 20a, the 'R' of Rainbow and of Ruler (two characters) are colored red, the same color as the first group of incremental division lines 22a corresponding to the ½" measured lengths. This serves as a "hint" when the student is first learning her/his inch fractions.

Figure 2:
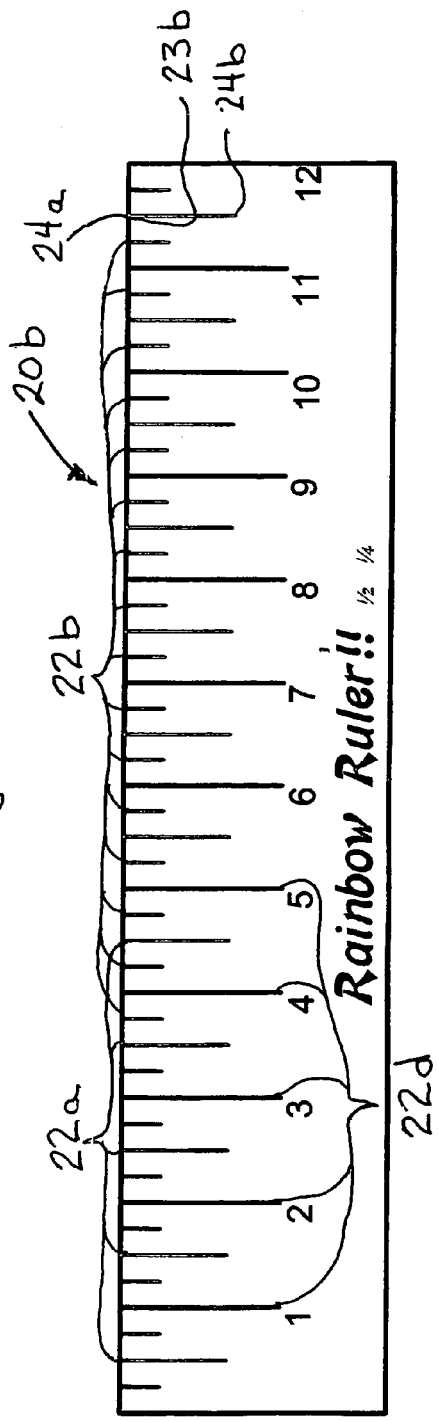
FIG. 2 is a front view of a second ruler of the set of rulers of the first embodiment.

Second ruler of the set of three is shown in FIG. 2 generally at 20b. Second ruler 20b has first group 22a of incremental division lines and a second group 22b of incremental division lines for a second group of measured lengths, in this case, ¼", each of the lines of second group 22b having a second length and a second color, in this case, blue, second group 22b a proximal end 23b of second group 22b extending from distal end 24a of the lines of first group 22a when second group (¼") of measured lengths correspond to the first group (½") of measured lengths. By way of example and not limitation (although this represents the preferred embodiment), the length of the second set 22b of lines is one-half the length of the first set 22a of lines, just as the measured lengths are ½ as long. Again, as a "hint", the "ai" of Rainbow and the "ul" of Ruler (four characters) are written in blue to indicate that the blue group 22b is subdividing ¼" increments.

Figure 3:
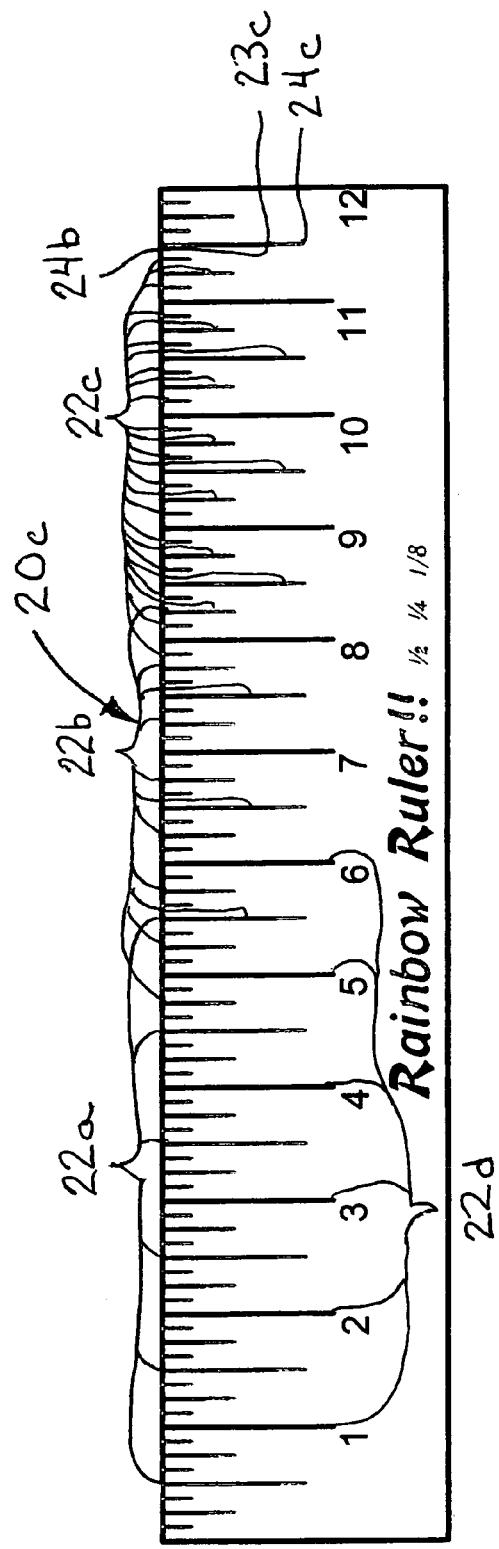
FIG. 3 is a front view of a third ruler of the set of rulers of the first embodiment.

Third ruler of the set of three is shown in FIG. 3 generally at 20c. In addition to the first group 22a of lines and second group of lines 22b, third ruler 20c has a third group 22c of incremental division lines for a third group of measured lengths, in this case, ⅛", each of the lines of the third group having a third length and a third color, in this case, green, the third group 22c of lines having a proximal end 23c extending from a distal end 24a of lines of first group 22a and second group 22b when the third group of measured lengths ⅛" correspond to first group ½" of measured lengths and second group ¼" of measured lengths, respectively. Once again, the length of each line of group 22c, is one half the length of the second group of lines 22b, corresponding to the dimensional relationship between the two measured lengths. It is envisioned that this third ruler could be used by itself, with some students, to convey the information concerning the three respective fractional lengths. On this ruler, the "nbow" of Rainbow and the "er!!" of Ruler!! (a total of eight characters) are written in green, the color of the third group 22c of lines, as a "hint" that the green lines are measuring ⅛" increments.

Each of the three rulers, 20a, 20b, and 20c has a fourth group 22d of incremental division lines for a fourth group of measured lengths, in this case 1", each of the lines of the fourth group 22*d* having a fourth length and fourth color, in this case black, the fourth length being greater than the first, second and third lengths and, in fact, being greater than all three combined by an incremental amount to indicate that the fourth measured length is greater than each of the other three.

It will be appreciated that in the use of the set of rulers 20*a*, 20*b*, and 20*c*, the teacher will use first ruler 20*a* to convey the concept of ½" fractional lengths and, then, progress to the second and third rulers 20*b* and 20*c* to impart an understanding of ¼" and ⅛" increments, respectively. In this manner, the teacher is able to more easily convey the concept of fractional inch lengths to the student, regardless of the child's teachability.

Various changes, alternatives, and modifications will become apparent to a person of ordinary skill in the art after a reading of the foregoing specification. For example, while the set of rulers of the present invention has been disclosed and, in fact, is, particularly suited for teaching educationally challenged students to learn to distinguish fractional measurements, the ruler would also have applicability, and superior teachability, for use with other students, as well. It is intended that all such changes, alternatives, and modifications as fall within the scope of the appended claims be considered part of the present invention.

I claim:

1. A set of rulers for teaching students to read measurements, said set comprising:
   a) a first ruler having a first group of incremental division lines for a first group of measured lengths, each of said lines of said first group having a first length extending from a proximal end to a distal end and being of a first color;
   b) a second ruler having said first group of incremental division lines of said first length and said first color and a second group of incremental division lines for a second group of measured lengths, each of said lines of said second group having a second length and a second color, said second group of lines having a proximal end beginning at and extending from a distal end of said lines of said first group when said second group of measured lengths correspond to said first group of measured lengths;
   c) a third ruler having
      i) said first group of incremental division lines of said first length and said first color,
      ii) said second group of incremental division lines of said second length and said second color and,
      iii) a third group of incremental division lines for a third group of measured lengths, each of said lines of said third group having a third length and a third color, said third group of lines having a proximal end beginning at and extending from a distal end of said lines of said second group when said third group of measured lengths correspond to said first group and said second group of measured lengths.

2. The set of rulers of claim 1 further comprising each of said three rulers having a fourth group of incremental division lines for a fourth group of measured lengths, each of said lines of said fourth group having a fourth length and fourth color, said fourth length being greater than said first, second and third lengths.

3. The set of rulers of claim 2 wherein said fourth length is greater than a combination of said first, second and third lengths for measured lengths where said third group of lines extend from said distal end of said second group of lines.

4. A ruler for teaching students to read measurements, said ruler comprising:
   a) a first group of incremental division lines for a first group of measured lengths, each of said lines of said first group having a first length extending from a proximal end to a distal end and being of a first color;
   b) a second group of incremental division lines for a second group of measured lengths, said second group of measured lengths being a first fraction of said first group of measured lengths, each of said lines of said second group having a second length which is a fractional length of said first length corresponding to said first fraction and a second color, said second group of lines having a proximal end beginning at and extending from a distal end of said lines of said first group when said second group of measured lengths correspond to said first group of measured lengths;
   c) a third group of incremental division lines for a third group of measured lengths, said third group of measured lengths being a second fraction of said second group of measured lengths, each of said lines of said third group having a third length which is a fractional length of said second length corresponding to said second fraction and a third color, said third group of lines having a proximal end beginning at and extending from a distal end of said lines of said second group when said third group of measured lengths correspond to said first group and said second group of measured lengths.

5. The ruler of claim 4 further comprising a fourth group of incremental division lines for a fourth group of measured lengths, each of said lines of said fourth group having a fourth length and fourth color, said fourth length being greater than said first, second and third lengths.

6. The ruler of claim 5 wherein said fourth length is greater than a combination of said first, second and third lengths for measured lengths where said third group of lines begin at and extend from said distal end of said second group of lines.

7. The ruler of claim 5 wherein a name, Rainbow Ruler!!, is written in letters of said first second and third colors, a number of each character of each said color corresponding to a denominator of said group of first second and third group of measured lengths being measured.

8. A method of teaching educationally-challenged students to read increments on a ruler comprising the steps of
   a) teaching the student to read a first group of major increments on a first ruler featuring a fourth group of incremental division lines having a fourth length and a fourth color and a first group of incremental division lines having a first length and a first color, said fourth length being different from said first length;
   b) teaching the student to read a second group of smaller increments on a second ruler featuring said first and fourth groups of incremental division lines and having a second group of incremental division lines having a second length and a second color positioned between said first and fourth groups and, where multiples of said second smaller group correspond to said first group of major increments, said second length having a fractional length of said first length corresponding to a fractional distance of said first distance being measured, said second incremental divisional lines beginning at and extending from a distal end of said first group of incremental division lines.

9. The method of teaching of claim 8 further comprising the step of c) teaching the student to read a third group of smallest increments on a third ruler featuring said first, second and fourth groups of incremental division lines and having a third group of incremental division lines having a third length which is has a fractional relationship to said second length which corresponds to the fractional relationship between the second increment and said third increment and a third color positioned between said first, second and fourth groups and, where multiples of said third smaller group correspond to said first group of major increments and said second group of smaller increments, beginning at and extending from a distal end of said group of incremental division lines.

\* \* \* \* \*